US012087233B2

(12) United States Patent
You et al.

(10) Patent No.: US 12,087,233 B2
(45) Date of Patent: Sep. 10, 2024

(54) DISPLAY DEVICE

(71) Applicant: LG Display Co., Ltd., Seoul (KR)

(72) Inventors: JaeYong You, Paju-si (KR); SungBin Ryu, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/472,646

(22) Filed: Sep. 22, 2023

(65) Prior Publication Data

US 2024/0112637 A1 Apr. 4, 2024

(30) Foreign Application Priority Data

Sep. 30, 2022 (KR) ........................ 10-2022-0124930

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2300/0842* (2013.01); *G09G 2310/0267* (2013.01); *G09G 2320/0247* (2013.01); *G09G 2330/021* (2013.01)

(58) Field of Classification Search
None
See application file for complete search history.

(56) References Cited

U.S. PATENT DOCUMENTS

2014/0339508 A1* 11/2014 Hong .................. H10K 59/123 257/40

* cited by examiner

*Primary Examiner* — Stephen T. Reed
(74) *Attorney, Agent, or Firm* — Fenwick & West LLP

(57) ABSTRACT

The disclosure relates to display devices. A display device comprises a display panel including a display area and a non-display area formed outside the display area and having a plurality of pixels and a gate driving unit including a scan driving unit for supplying a scan signal to the display panel and an emission control driving unit for supplying an emission control signal. The plurality of pixels include a light emitting element for emitting light in a brightness corresponding to a current amount of a driving current applied, a driving transistor for controlling the current amount applied to the light emitting element, a storage capacitor connected to the driving transistor, and a first transistor and a second transistor including an oxide semiconductor layer and configured to be simultaneously turned on according to the scan signal.

21 Claims, 9 Drawing Sheets

DISPLAY DEVICE

CROSS-REFERENCE TO RELATED APPLICATION

This application claims priority from Republic of Korea Patent Application No. 10-2022-0124930, filed on Sep. 30, 2022, which is hereby incorporated by reference fin its entirety.

FIELD

The disclosure relates to a display device using a variable refresh rate (VRR) mode, and is intended to implement a display device having a narrow bezel by simplifying a pixel circuit and a gate driving unit.

BACKGROUND

A display device using a light emitting element, such as an organic light emitting diode, may be driven by various driving frequencies.

Recently, as one of the various functions required for display devices, a variable refresh rate (VRR) is also required. VRR is a technology that operates pixels by driving at a constant frequency and increasing the refresh rate at a time when high-speed driving is required. Further, it is a technology to operate pixels by lowering the refresh rate at a time when power consumption is reduced or low-speed driving is required.

SUMMARY

One embodiment of the disclosure relates to a display device using a variable refresh rate (VRR) mode and may implement a display device having a narrow bezel by simplifying a pixel circuit and a gate driving unit by integrating gate signals supplied to the pixel circuits during low-frequency driving in the VRR mode.

A display device according to an embodiment of the disclosure comprises a display panel including a display area and a non-display area formed outside the display area and having a plurality of pixels and a gate driving unit including a scan driving unit for supplying a scan signal to the display panel and an emission control driving unit for supplying an emission control signal. The plurality of pixels include a light emitting element for emitting light in a brightness corresponding to a current amount of a driving current applied, a driving transistor controlling the current amount applied to the light emitting element, a storage capacitor connected to the driving transistor, and a first transistor and a second transistor including an oxide semiconductor layer and configured to be simultaneously turned on according to the scan signal.

Objects of the disclosure are not limited to the foregoing, and other unmentioned objects would be apparent to one of ordinary skill in the art from the following description.

Effects of the Disclosure

The display device according to the embodiments of the disclosure may integrate scan signals applied to a plurality of switching transistors in a pixel circuit. Emission control signals applied to the remaining plurality of switching transistors may also be integrated. Therefore, it is possible to simplify the structure of the pixel. Since the gate driving unit is configured to have only one scan driving unit and one emission control signal driving unit, it is possible to simplify the structure of the gate driving unit, implementing a narrow bezel. Further, as the circuit constituting the gate driving unit is simplified, power consumption may also be reduced. Effects of the disclosure are not limited to the foregoing, and other unmentioned effects would be apparent to one of ordinary skill in the art from the following description.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
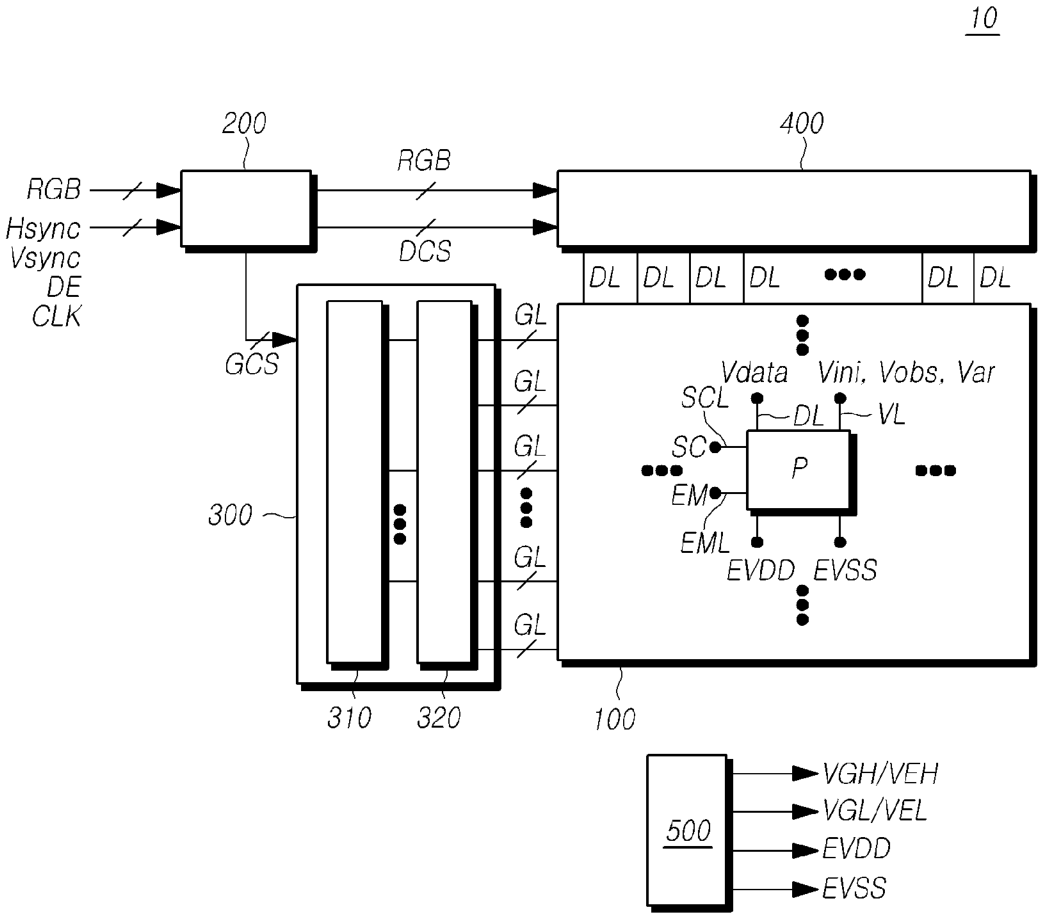
FIG. 1 is a block diagram schematically illustrating a display device according to an embodiment of the disclosure.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items.

The terms as used herein are provided merely to describe some embodiments thereof, but not intended as limiting the disclosure. As used herein, the singular forms "a," "an," and "the" are intended to include the plural forms as well, unless the context clearly indicates otherwise. As used herein, the term "comprises" and/or "comprising" does not exclude the presence or addition of one or more other components, steps, operations, and/or elements than the component, step, operation, and/or element already mentioned.

Although the terms "first" and "second" are used to describe various components, the components are not limited by the terms. These terms are provided simply to distinguish one component from another.

Accordingly, the first component mentioned herein may also be the second component within the technical spirit of the disclosure. Unless defined otherwise, all the terms (including technical and scientific terms) used herein may be construed as commonly appreciated by one of ordinary skill in the art to which the disclosure pertains. Further, terms defined in a dictionary commonly used are not ideally or overly interpreted unless defined expressly or specifically.

FIG. 1 is a block diagram schematically illustrating a display device according to an embodiment of the disclosure.

Referring to FIG. 1, a display device 10 includes a display panel 100 including a plurality of pixels P, a controller 200, a gate driving unit 300 (e.g., a circuit) for supplying a gate signal to each of the plurality of pixels P, a data driving unit 400 (e.g., a circuit) for supplying a data signal to each of the plurality of pixels P, and a power supply unit 500 (e.g., a circuit) for supplying power necessary for driving to each of the plurality of pixels P.

The display panel 100 includes a display area AA (refer to FIG. 2) where the pixel P is positioned and a non-display area NA (refer to FIG. 2) that surrounds the display area AA and where the gate driving unit 300 and the data driving unit 400 are disposed.

In the display panel 100, a plurality of gate lines GL and a plurality of data lines DL cross each other. Each of the plurality of pixels P is connected to the gate line GL and the data line DL. Specifically, one pixel P receives a gate signal from the gate driving unit 300 through the gate line GL, receives a data signal from the data driving unit 400 through the data line DL, and receives a high-potential driving voltage EVDD and a low-potential driving voltage EVSS from the power supply unit 500.

Here, the gate line GL supplies the scan signal SC and the emission control signal EM, and the data line DL supplies the data voltage Vdata. Further, according to various embodiments, the gate line GL may include a plurality of scan lines SCL for supplying the scan signals SC and emission control lines EML for supplying the emission control signals EM. Further, the plurality of pixels P may further include a power line VL to receive a bias voltage Vobs and initialization voltages Var and Vini.

Figure 2:
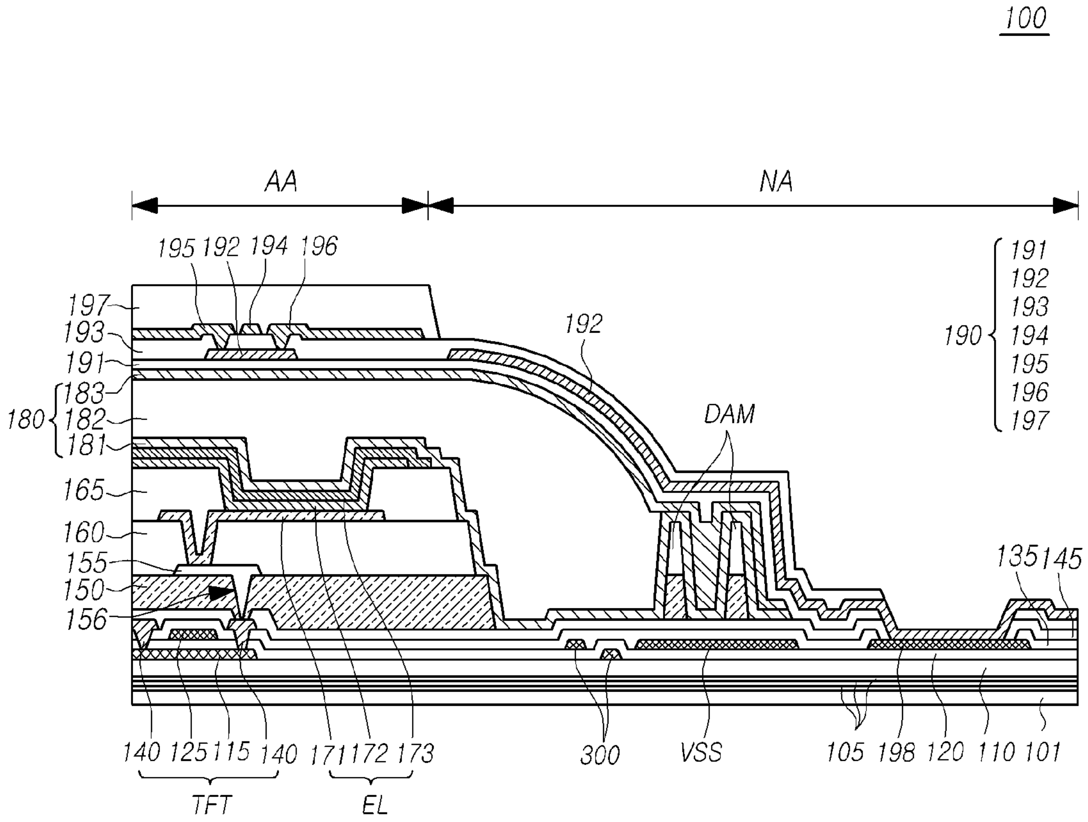
FIG. 2 is a cross-sectional view illustrating a stacked form of a display device according to an embodiment of the disclosure.

Further, each of the pixels P may include a light emitting element EL and a pixel circuit that controls driving of the light emitting element EL, as shown in FIG. 2. The light emitting element EL is composed of an anode electrode 171, a cathode electrode 173, and a light emitting layer 172 between the anode electrode 171 and the cathode electrode 173.

The pixel circuit may include a plurality of switching elements, driving elements, and capacitors. The switching element and the driving element may be composed of transistors. In the pixel circuit, the driving element controls the amount of current supplied to the light emitting element EL according to the data voltage, thereby adjusting the amount of light emitted from the light emitting element EL. The plurality of switching elements receive the scan signals SC supplied through the plurality of scan lines SCL and the emission control signal EM supplied through the emission control line EML, operating the pixel circuit.

The display panel 100 may be implemented as a non-transmissive display panel or a transmissive display panel. The transmissive display panel may be applied to a transparent display device in which an image is displayed on the screen and a real object in the background is visible. The display panel 100 may be formed of a flexible display panel. The flexible display panel may be implemented as an organic light emitting diode (OLED) panel using a plastic substrate.

Each of the pixels P may be divided into a red sub-pixel, a green sub-pixel, and a blue sub-pixel for color implementation. Each of the pixels P may further include a white sub-pixel. Each of the pixels P includes a pixel circuit.

Touch sensors may be disposed on the display panel 100. The touch input may be sensed by separate touch sensors or sensed through the pixels P. The touch sensors may be disposed on the screen of the display panel 100 in an on-cell type or add-on type, or be implemented as in-cell type touch sensors built in the display panel 100.

The controller 200 processes image data RGB input from the outside to suit the size and resolution of the display panel 100 and supplies the data to the data driving unit 400. The controller 200 generates a gate control signal GCS and a data control signal DCS using synchronizing signals input from the outside (e.g., a dot clock signal CLK, a data enable signal DE, a horizontal synchronization signal Hsync, and a vertical synchronization signal Vsync). By supplying the generated gate control signal GCS and data control signal DCS to the gate driving unit 300 and the data driving unit 400, respectively, the gate driving unit 300 and the data driving unit 400 are controlled.

In this case, one period of the vertical synchronization signal Vsync is one frame period. One period of the horizontal synchronization signal Hsync and the data enable signal DE is one horizontal period (1H). A pulse of the data enable signal DE may be synchronized with 1 line data to be written to pixels of 1 pixel line. The controller 200 may be configured to be integrated with various processors, e.g., a microprocessor, a mobile processor, an application processor, etc., depending on a device to be mounted thereon.

The host system may be any one of a television (TV) system, a set-top box, a navigation system, a personal computer (PC), a home theater system, a mobile device, a wearable device, and a vehicle system.

The controller 200 multiplies the input frame frequency by i to control the operation timing of the display panel driving unit at a frame frequency of input frame frequency×i (where, i is a positive integer larger than 0) Hz. The input frame frequency is 60 Hz in the national television standards committee (NTSC) scheme and 50 Hz in the phase-alternating line (PAL) scheme.

The controller 200 generates signals so that the pixels P may be driven at various refresh rates. In other words, the controller 200 generates driving-related signals such that the pixel P is driven at a variable refresh rate (VRR) mode or to be switchable between a first refresh rate and a second refresh rate. For example, the controller 200 may simply change the speed of the clock signal, generate a synchronization signal to create a horizontal blank or vertical blank, or drive the gate driving unit 300 in a mask scheme, driving the pixel P at various refresh rates.

The controller 200 generates a gate control signal GCS for controlling the operation timing of the gate driving unit 300 and a data control signal DSC for controlling the operation timing of the data driving unit 400 based on the timing signals Vsync, Hsync, and DE received from the host system. The controller 200 controls the operation timing of the display panel driving unit to synchronize the gate driving unit 300 and the data driving unit 400.

The voltage level of the gate control signal GCS output from the controller 200 may be converted into gate-on voltages VGL and VEL and gate-off voltages VGH and VEH through a level shifter (not shown) and be supplied to the gate driving unit 300. The level shifter converts the low level voltage of the gate control signal GCS into a gate low voltage VGL and converts the high level voltage of the gate control signal GCS to the gate high voltage VGH. The gate control signal GCS includes a start pulse and a shift clock.

The gate driving unit 300 supplies the scan signal SC to the gate line GL according to the gate control signal GCS supplied from the controller 200. The gate driving unit 300 may be disposed on one side or two opposite sides of the display panel 100 in a gate in panel (GIP) type.

The gate driving unit 300 sequentially outputs gate signals to the plurality of gate lines GL under the control of the controller 200. The gate driving unit 300 may sequentially supply the gate signals to the gate lines GL by shifting the gate signals using the shift register.

The gate signal may include a scan signal (SC) and an emission control signal (EM) in an organic light emitting display device. The scan signal SC may include a scan pulse swinging between a gate-on voltage VGL and a gate-off voltage VGH. The emission control signal EM may include an emission control signal pulse that swings between a gate-on voltage VEL and a gate-off voltage VEH.

The scan pulse is synchronized with the data voltage Vdata to select pixels P of the line where data is to be written. The emission control signal EM defines the emission times of the pixels P.

The gate driving unit 300 may include an emission control signal driving unit 310 and at least one scan driving unit 320.

The emission control signal driving unit 310 outputs an emission control signal pulse in response to a start pulse and a shift clock from the controller 200 and sequentially shifts the emission control signal pulse according to the shift clock.

At least one scan driving unit 320 (e.g., a circuit) may output a scan pulse in response to the start pulse and the shift clock from the controller 200 and shifts the scan pulse according to the shift clock timing.

The data driving unit 400 (e.g., a circuit) may convert the image data RGB into the data voltage Vdata according to the data control signal DCS supplied from the controller 200 and supplies the converted data voltage Vdata to the pixel P through the data line DL.

Although it is illustrated in FIG. 1 that one data driving unit 400 is disposed on one side of the display panel 100, the number and location of the data driving units 400 are not limited thereto.

In other words, the data driving unit 400 may be composed of a plurality of integrated circuits (ICs) and may be divided into a plurality of units and disposed on one side of the display panel 100.

The power supply unit 500 generates direct current (DC) power necessary for driving the pixel array of the display panel 100 and the display panel driving unit by means of a DC-DC converter. The DC-DC converter may include a charge pump, a regulator, a buck converter, a boost converter, and the like. The power supply unit 500 receives a DC input voltage applied from a host system (not shown) and generates DC voltages, such as gate-on voltages VGL and VEL, gate-off voltages VGH and VEH, a high-potential driving voltage EVDD, and a low-potential driving voltage EVSS. The gate-on voltages VGL and VEL and gate-off voltages VGH and VEH are supplied to a level shifter (not shown) and the gate driving unit 300. The high-potential driving voltage EVDD and the low-potential driving voltage EVSS are commonly supplied to the pixels P.

FIG. 2 is a cross-sectional view illustrating a stacked form of a display device according to an embodiment of the disclosure.

Referring to FIG. 2, a transistor TFT for driving a light emitting element EL may be disposed in the display area AA on the substrate 101. The transistor TFT may include a semiconductor layer 115, a gate electrode 125, and source and drain electrodes 140. The transistor TFT is a driving transistor DT (see FIG. 4). For convenience of description, only the driving transistor DT is shown among various transistors that may be included in the display device 10, but other transistors, such as switching transistors, may also be included in the display device 10. Further, although the transistor TFT is described as having a coplanar structure in the disclosure, the transistor may be implemented in another structure, such as a staggered structure, but is not limited thereto.

The driving transistor DT receives the high-potential driving voltage EVDD in response to the data signal supplied to the gate electrode 125 of the driving transistor DT and controls the current supplied to the light emitting element EL to adjust the amount of light emitted from the light emitting element EL, and supplies a constant current until the data signal of the next frame is supplied by the voltage charged in the storage capacitor (not shown) to maintain light emission of the light emitting element EL. The high-potential supply line may be formed parallel to the data line.

As shown in FIG. 2, the transistor TFT may include the semiconductor layer 115 disposed on a first insulation layer 110, the gate electrode 125 overlapping the semiconductor layer 115, with a second insulation layer 120 disposed therebetween, and the source and drain electrodes 140 formed on the third insulation layer 135 to contact the semiconductor layer 115.

The semiconductor layer 115 may be an area where a channel is formed when the transistor TFT is driven. The semiconductor layer 115 may be formed of an oxide semiconductor or may be formed of various organic semiconductors, such as amorphous silicon (a-Si), polycrystalline silicon (poly-Si), or pentacene, but is not limited thereto. The semiconductor layer 115 may be formed on the first insulation layer 110. The semiconductor layer 115 may include a channel area, a source area, and a drain area. The channel area may overlap the gate electrode 125 with the first insulation layer 110 disposed therebetween to form a channel area between the source and drain electrodes 140. The source area is electrically connected to the source electrode 140 through the contact hole penetrating the second insulation layer 120 and the third insulation layer 135. The drain area may be electrically connected to the drain electrode 140 through the contact hole penetrating the second insulation layer 120 and the third insulation layer 135. A buffer layer 105 and a first insulation layer 110 may be disposed between the semiconductor layer 115 and the substrate 101. The buffer layer 105 may delay diffusion of moisture and/or oxygen penetrating into the substrate 101. The first insulation layer 110 protects the semiconductor layer 115 and may block various types of defects introduced from the substrate 101.

The uppermost layer of the buffer layer 105 in contact with the first insulation layer 110 may be formed of a material different in etch characteristic from the remaining layers of the buffer layer 105, the first insulation layer 110, the second insulation layer 120, and the third insulation layer 135. The uppermost layer of the buffer layer 105 contacting the first insulation layer 110 may be formed of any one of silicon nitride (SiNx) and silicon oxide (SiOx). The remaining layers of the buffer layer 105, the first insulation layer 110, the second insulation layer 120, and the third insulation layer 135 may be formed of the other one of silicon nitride (SiNx) and silicon oxide (SiOx). For example, the uppermost layer of the buffer layer 105 contacting the first insulation layer 110 may be formed of silicon nitride (SiNx), and the remaining layers of the buffer layer 105, the first insulation layer 110, the second insulation layer 120, and the third insulation layer 135 may be formed of silicon oxide (SiOx), but embodiments of the disclosure are not limited thereto.

The gate electrode 125 may be formed on the second insulation layer 120 and may overlap the channel area of the semiconductor layer 115 with the second insulation layer 120 interposed therebetween. The gate electrode 125 may be formed of a first conductive material which is a single layer or multiple layers formed of any one or an alloy of magnesium (Mg), molybdenum (Mo), aluminum (Al), chromium (Cr), gold (Au), titanium (Ti), nickel (Ni), neodymium (Nd), and copper (Cu), but is not limited thereto.

The source electrode 140 may be connected to the exposed source area of the semiconductor layer 115 through the contact hole passing through the second insulation layer 120 and the third insulation layer 135. The drain electrode 140 may face the source electrode 140 and may be connected to the drain area of the semiconductor layer 115 through the contact hole passing through the second insulation layer 120 and the third insulation layer 135. The source and drain electrode 140 may be formed of a second conductive material which is a single layer or multiple layers formed of any one or an alloy of two or more of magnesium (Mg), molybdenum (Mo), aluminum (Al), chromium (Cr), gold (Au), titanium (Ti), nickel (Ni), neodymium (Nd), and copper (Cu), but is not limited thereto.

The connection electrode 155 may be disposed between the first intermediate layer 150 and the second intermediate layer 160. The connection electrode 155 may be exposed through the connection electrode contact hole 156 penetrating the passivation film 145 and the first intermediate layer 150 to be connected to the drain electrode 140. The connection electrode 155 may be formed of a material having a low specific resistance similar to or the same as that of the drain electrode 140, but is not limited thereto.

Referring to FIG. 2, a light emitting element EL including a light emitting layer 172 may be disposed on the second intermediate layer 160 and the bank layer 165. The light emitting element EL may include an anode electrode 171, at least one light emitting layer 172 formed on the anode electrode 171, and a cathode electrode 173 formed on the light emitting layer 172.

The anode electrode 171 is disposed on the first intermediate layer 150 through the contact hole penetrating the second intermediate layer 160 and may be electrically connected to the connection electrode 155 exposed upward of the second intermediate layer 160.

The anode electrode 171 of each pixel is formed to be exposed by the bank layer 165. The bank layer 165 may be formed of an opaque material (e.g., black) to prevent light interference between adjacent pixels. In this case, the bank layer 165 may include a light-blocking material formed of at least one of color pigments, organic black, and carbon, but is not limited thereto.

Referring to FIG. 2, at least one light emitting layer 172 may be formed on the anode electrode 171 of the emission area provided by the bank layer 165. At least one light emitting layer 172 may include a hole transport layer, a hole injection layer, a hole blocking layer, a light emitting layer 172, an electron injection layer, an electron blocking layer, and an electron transport layer on the anode electrode 171, which may be stacked sequentially or in reverse order according to the direction of light emission. Further, the light emitting layer 172 may include first and second light emitting stacks facing each other with a charge generating layer interposed therebetween. In this case, any one light emitting layer 172 of the first and second light emitting stacks may generate blue light, and the other light emitting layer 172 may generate yellow-green light, generating white light through the first and second light emitting stacks. Since the white light generated by the light emitting stacks is incident on a color filter positioned above or below the light emitting layer 172, a color image may be realized. As another example, a color image may be implemented by generating color light corresponding to each pixel in each light emitting layer 172 without a separate color filter. For example, the light emitting layer 172 of the red pixel may generate red light, the light emitting layer 172 of the green pixel may generate green light, and the light emitting layer 172 of the blue pixel may generate blue light.

Referring to FIG. 2, the cathode electrode 173 may be formed to face the anode electrode 171 with the light emitting layer 172 interposed therebetween, and may receive a high-potential driving voltage EVDD.

The encapsulation layer 180 may block or at least reduce penetration of external moisture or oxygen into the light emitting element EL which is vulnerable to external moisture or oxygen. To this end, the encapsulation layer 180 may include at least one inorganic encapsulation layer and at least one organic encapsulation layer, but is not limited thereto. In the disclosure, a structure of the encapsulation layer 180 in which the first encapsulation layer 181, the second encapsulation layer 182, and the third encapsulation layer 183 are sequentially stacked is described as an example.

The first encapsulation layer 181 is formed on the substrate 101 on which the cathode electrode 173 is formed. The third encapsulation layer 183 may be formed on the substrate 101 on which the second encapsulation layer 182 is formed, and may be formed to, together with the first encapsulation layer 181, surround the upper, lower, and side surfaces of the second encapsulation layer 182. The first encapsulation layer 181 and the third encapsulation layer 183 may reduce or prevent penetration of external moisture or oxygen into the light emitting element EL. The first encapsulation layer 181 and the third encapsulation layer 183 may be formed of an inorganic insulation material capable of low-temperature deposition, such as, e.g., silicon nitride (SiNx), silicon oxide (SiOx), silicon oxynitride (SiON), or aluminum oxide (Al2O3). Since the first encapsulation layer 181 and the third encapsulation layer 183 are deposited in a low temperature atmosphere, a light emitting element EL vulnerable to a high temperature atmosphere may be prevented from damage during the deposition process of the first encapsulation layer 181 and the third encapsulation layer 183.

The second encapsulation layer 182 serves as a buffer to relieve stress between the layers due to bending of the display device 10 and may flatten a step between the layers. The second encapsulation layer 182 is formed of a non-photosensitive organic insulating material, such as acrylic resin, epoxy resin, phenolic resin, polyamide resin, polyimide resin, polyethylene or silicon oxycarbon (SiOC), or a photosensitive organic insulating material, such as photo acrylic, formed on the substrate 101 on which the first encapsulation layer 181 is formed, but is not limited thereto.

When the second encapsulation layer 182 is formed through an inkjet method, a dam DAM may be disposed to prevent the liquid second encapsulation layer 182 from spreading to the edge of the substrate 101. The dam DAM may be disposed closer to the edge of the substrate 101 than the second encapsulation layer 182. The dam DAM may prevent diffusion of the second encapsulation layer 182 to the pad area where the conductive pad disposed on the outermost edge of the substrate 101 is disposed.

The dam DAM is designed to prevent or at least reduce diffusion of the second encapsulation layer 182, but when the second encapsulation layer 182 is formed to exceed the height of the dam DAM during the process, the second encapsulation layer 182 which is an organic layer may be exposed to the outside, so that, e.g., moisture may easily penetrate into the light emitting element. Therefore, to prevent this, at least 10 or more dams DAM may be repeatedly formed.

Referring to FIG. 2, the dam DAM may be disposed on the passivation film 145 of the non-display area NA.

Further, the dam DAM may be formed simultaneously with the first intermediate layer 150 and the second intermediate layer 160. When the first intermediate layer 150 is formed, the lower layer of the dam DAM is formed together and, when the second intermediate layer 160 is formed, the upper layer of the dam DAM may be formed together, so that they may be formed to be stacked in a dual structure.

Accordingly, the dam DAM may be formed of the same material as the first intermediate layer 150 and the second intermediate layer 160, but is not limited thereto.

Referring to FIG. 2, the dam DAM may be formed to overlap the low-potential driving power line VSS. For example, the low-potential driving power line VSS may be formed on a lower layer of an area where the dam DAM is positioned in the non-display area NA.

The gate driving unit 300 configured in the form of a low-potential driving power line VSS and a gate in panel GIP may be formed to surround the periphery of the display panel, and the low-potential driving power line VSS may be positioned outside the gate driving unit 300. Further, the low-potential driving power line VSS may be connected to the anode electrode 171 to apply a common voltage. Although the gate driving unit 300 is simply represented in the plan and cross-sectional views, it may be configured using a transistor TFT having the same structure as the transistor TFT of the display area AA.

Referring to FIG. 2, the low-potential driving power supply line VSS is disposed outside the gate driving unit 300. The low-potential driving power line VSS is disposed outside the gate driving unit 300 and surrounds the display area AA. The low-potential driving power line VSS may be formed of the same material as the source and drain electrode 140 of the transistor TFT, but is not limited thereto. For example, the low-potential driving power line VSS may be formed of the same material as the gate electrode 125.

Further, the low-potential driving power line VSS may be electrically connected to the anode electrode 171. The low-potential driving power line VS S may supply the low-potential driving voltage EVSS to a plurality of pixels in the display area AA.

A touch layer 190 may be disposed on the encapsulation layer 180. In the touch layer 190, the touch buffer film 191 may be positioned between the touch sensor metal including the touch electrode connection lines 192 and 194 and the touch electrodes 195 and 196 and the cathode electrode 173 of the light emitting element EL.

The touch buffer film 191 may block off or at least reduce penetration, into the organic material-containing light emitting layer 172, of external moisture or the chemical (e.g., developer or etchant) used upon manufacturing the touch sensor metal disposed on the touch buffer film 191. Thus, the touch buffer film 191 may prevent damage to the light emitting layer 172 vulnerable to chemicals or moisture.

The touch buffer film 191 is formed of an organic insulation material with a low permittivity of 1 to 3 and formed at a low temperature which is not more than a predetermined temperature (e.g., 100° C.) to prevent damage to the light emitting layer 172 containing the organic material vulnerable to high temperature. For example, the touch buffer film 191 may be formed of an acrylic-based, epoxy-based, or siloxane-based material. The touch buffer film 191 with planarizability, formed of an organic insulation material, may prevent fracture of the touch sensor metal formed on the touch buffer film 191 and damage to the encapsulation layer 180 due to a warping of the organic light emitting display device.

According to the mutual-capacitance-based touch sensor structure, the touch electrodes 195 and 196 may be disposed on the touch buffer film 191, and the touch electrodes 195 and 196 may be disposed to cross each other.

The touch electrode connection lines 192 and 194 may electrically connect the touch electrodes 195 and 196 to each other. The touch electrode connection lines 192 and 194 and the touch electrodes 195 and 196 may be positioned on different layers with the touch insulation film 193 interposed therebetween.

The touch electrode connection lines 192 and 194 may be disposed to overlap the bank layer 165, preventing a lowering of the aperture ratio.

Meanwhile, in the touch electrodes 195 and 196, a part of the touch electrode connection line 192 may pass through the upper portion and side surface of the encapsulation layer 180 and be electrically connected with the touch driving circuit (not shown) through the touch pad 198.

A part of the touch electrode connection line 192 may receive a touch driving signal from the touch driving circuit and transfer it to the touch electrodes 195 and 196 and transfer the touch sensing signals from the touch electrodes 195 and 196 to the touch driving circuit.

A touch passivation film 197 may be disposed on the touch electrodes 195 and 196. In the drawings, the touch passivation film 197 is shown as being disposed only on the touch electrodes 195 and 196 but, without limitations thereto, the touch passivation film 197 may extend to the front or rear of the dam DAM to be disposed on the touch electrode connection line 192 as well.

A color filter (not shown) may be further disposed on the encapsulation layer 180, and the color filter may be positioned on the touch layer 190 or be positioned between the encapsulation layer 180 and the touch layer 190.

Figure 3:
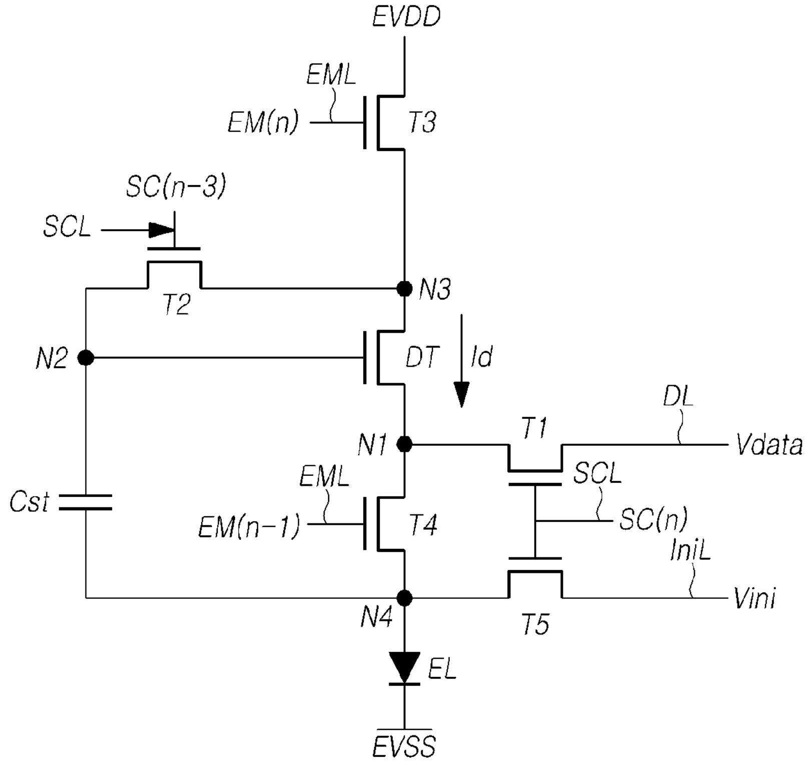
FIG. 3 is a view illustrating a pixel circuit in a display device according to an embodiment of the disclosure.

FIG. 3 is a view illustrating a pixel circuit in a display device according to an embodiment of the disclosure.

Referring to FIG. 3, each of the plurality of pixels P may include a pixel circuit having a driving transistor DT and a light emitting element EL connected to the pixel circuit.

The pixel circuit may control the driving current Id flowing through the light emitting element EL to drive the light emitting element EL. The pixel circuit may include two or more switching transistors T1, T2, T3, T4, and T5 that control the driving timing of the driving transistor DT. The transistors DT, T1 to T5 each may include a first electrode, a second electrode, and a gate electrode. One of the first electrode and the second electrode may be a source electrode, and the other of the first electrode and the second electrode may be a drain electrode. A storage capacitor Cst for maintaining the data voltage Vdata for supplying driving current Id for one frame may be disposed in the subpixel SP.

Although FIG. 3 illustrates a 6T1C structure in which six transistors and one capacitor are disposed in each pixel in addition to the light emitting element EL as an example, embodiments of the disclosure are not limited thereto. Further, although in the example illustrated in FIG. 3, all of the transistors disposed in the pixel are of N-type, at least some of the transistors disposed in the pixel may be of P-type. Further, the N-type transistor may be an oxide transistor, and the P-type transistor may be a polycrystalline silicon transistor.

According to an example, the first switching transistor T1 constituting the pixel circuit may function as a data supply transistor, the second switching transistor T2 may function as a compensation transistor, the third and fourth switching transistors T3 and T4 may function as emission control transistors, and the fifth switching transistor T5 may function as an initialization transistor.

The first switching transistor T1 may be electrically connected between a first data line DL and a first node N1. The first switching transistor T1 may be controlled by the scan signal SC(n) supplied through the scan line SCL of the nth pixel row. The first switching transistor T1 may control application of the data voltage Vdata, which is supplied through the data line DL, to the first node N1. The first switching transistor T1 may be a data supply transistor. The data voltage Vdata applied to the first node N1 may be applied to the second node N2 through the driving transistor DT and the second switching transistor T2. The first node N1 may be, e.g., the source node or the drain node of the driving transistor DT. The second node N2 may be, e.g., the gate node of the driving transistor DT. The third node N3 may be, e.g., the drain node or the source node of the driving transistor DT.

The second switching transistor T2 may be electrically connected between the second node N2 and the third node N3. The second switching transistor T2 may be controlled by the scan signal SC(n−3) supplied through the scan line SCL of the n−3th pixel row. The second switching transistor T2 may control the application of the data voltage Vdata applied to the first node N1 to the second node N2 via the third node N3.

The second switching transistor T2 may be diode-connected between the second node N2 and the third node N3 to sample the threshold voltage Vth of the driving transistor DT. The second switching transistor T2 may be a compensation transistor.

The third switching transistor T3 may be electrically connected between the power line to which the high-potential driving voltage EVDD is supplied and the third node N3. The third switching transistor T3 may be controlled by the emission control signal EM(n) supplied through the emission control line EML of the nth pixel row. The third switching transistor T3 may control the application of the high-potential driving voltage EVDD to the third node N3.

The fourth switching transistor T4 may be electrically connected between the first node N1 and the fourth node N4. The fourth switching transistor T4 may be controlled by the emission control signal EM(n−1) supplied through the emission control line EML of the n−1th pixel row. The fourth switching transistor T4 may control the application of the driving current Id to the fourth node N4. The fourth node N4 may be a node electrically connected to the anode electrode of the light emitting element EL.

The third switching transistor T3 and the fourth switching transistor T4 (or the first and second emission control transistors) may be connected between the high-potential driving voltage EVDD and the light emitting element EL, forming a current movement path through which the driving current Id generated by the driving transistor DT moves.

The fifth switching transistor T5 may be electrically connected between the initialization voltage line IniL and the fourth node N4. The fifth switching transistor T5 may be controlled by the scan signal SC(n) supplied through the scan line SCL of the nth pixel row. The fifth switching transistor T5 may control application of the initialization voltage Vini to the fourth node N4.

The light emitting element EL may have a parasitic capacitor formed between the anode electrode and the cathode electrode. While the light emitting element EL emits light, the parasitic capacitor is charged so that the anode electrode of the light emitting element EL may have a specific voltage. Accordingly, the amount of charge accumulated in the light emitting element EL may be initialized by applying the initialization voltage Vini to the anode electrode of the light emitting element EL through the fifth switching transistor T5.

The driving transistor DT may be electrically connected between the third switching transistor T3 and the fourth switching transistor T4. The driving transistor DT may supply the driving current Id according to the data voltage Vdata applied to the second node N2 to the light emitting element EL.

The storage capacitor Cst may be electrically connected between the second node N2 and the fourth node N4. The storage capacitor Cst may be considered to be electrically connected between the gate node and the source node of the driving transistor DT. The storage capacitor Cst may maintain the data voltage Vdata for one frame.

The light emitting element EL may be electrically connected between the fourth node N4 and the power line to which the low-potential driving voltage EVSS is supplied. The light emitting element EL may include an anode electrode 171, a cathode electrode 173, and a light emitting layer 172 between the anode electrode 171 and the cathode electrode 173, as an example. The light emitting element EL may display a brightness according to the driving current Id supplied by the driving transistor DT.

The pixel circuit disposed in each pixel may be driven according to the timings of the signals supplied through the scan line SCL and the emission control line EML. The light emitting element EL may emit light for a predetermined period according to driving of the pixel circuit.

Figure 4:
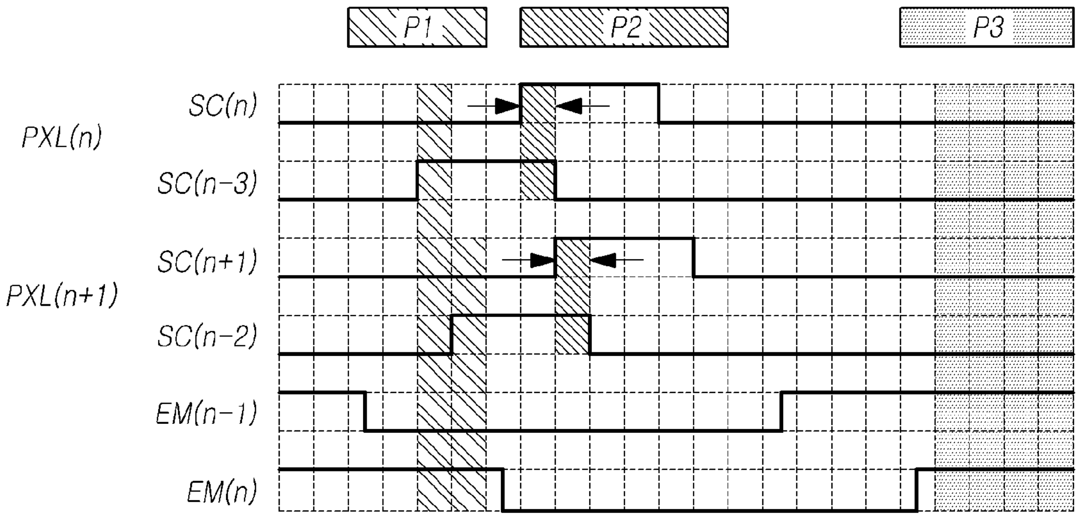
FIG. 4 is a view illustrating an example driving timing of the pixel circuit shown in FIG. 3 according to an embodiment of the disclosure.

FIG. 4 is a view illustrating an example driving timing of the pixel circuit shown in FIG. 3 according to one embodiment.

FIG. 4 exemplarily illustrates the timings of driving the pixel disposed in the nth row and the pixel disposed in the n+1th row.

The scan signal SC(n) and pulse width may be set to maintain a turn-on level for about 4 horizontal periods (4H). Further, the emission control signal EM(n) may be set to maintain a turn-off level for about 12 horizontal periods 12H.

Since the scan signal SC(n−3) supplied to the scan line SCL of the n−3th pixel row in the first period P1 is at the turn-on level, so that the second switching transistor T2 is turned on. At the same time, since the emission control signal EM(n) supplied through the emission control line EML of the nth pixel row is also at the turn-on level, the third switching transistor T3 may be in the turn-on state.

Since the second switching transistor T2 is turned on, the second node N2 and the third node N3 are electrically connected, and a diode connection may be made between the second node N2 and the third node N3.

In a state in which the scan signal SC(n−3) supplied to the scan line SCL of the n−3 pixel row maintains the turn-on level in the second period P2, the scan signal SC(n) supplied to the scan line SCL of the nth pixel row may become the turn-on level. In other words, the scan signal SC(n−3) of the n−3th pixel row and the scan signal SC(n) of the nth pixel row may overlap for at least 1 horizontal period 1H and be at the turn-on level. Accordingly, the first switching transistor T1 and the fifth switching transistor T5 may be turned on. Further, since the emission control signal EM(n) is at the turn-off level, the third switching transistor T3 may be in the turn-off state.

Since the first switching transistor T1 is turned on, the data voltage Vdata applied to the first node N1 may be applied to the second node N2 through the second switching transistor T2 and the driving transistor DT which are in the diode-connected state.

In this process, a voltage reflecting the threshold voltage of the driving transistor DT may be applied to the second node N2. A change in the threshold voltage of the driving transistor DT may be compensated for, and the driving current corresponding to the data voltage Vdata may be supplied by the driving transistor DT.

After the second period P2, the scan signal SC(n−3) of the n−3th pixel row and the scan signal SC(n) of the nth pixel row may be sequentially supplied at the turn-off level. Furthermore, the emission control signal EM(n−1) of the n−1th emission control line EML and the emission control signal EM(n) of the nth emission control line EML may be sequentially supplied at the turn-on level.

When the emission control signal EM(n−1) supplied through the n−1th emission control line EML is at the turn-on level, the fourth switching transistor T4 may be turned on. The initialization voltage Vini may be applied to the first node N1 and the fourth node N4.

When the emission control signal EM(n) supplied through the nth emission control line EML is at the turn-on level, the third switching transistor T3 may be turned on, so that the high-potential driving voltage EVDD may be supplied to the third node N3.

A driving current according to a difference between the voltage applied to the second node N2 and the voltage applied to the first node N1 of the driving transistor DT may be supplied to the light emitting element EL. During the third period P3, the light emitting element EL displays a brightness according to the driving current, and an image may be displayed through the plurality of pixels.

In other words, in the third period P3, the light emitting element EL may emit light with a driving current that offsets the threshold voltage Vth and corresponds to the sampled data voltage.

As the third switching transistor T3 is turned on, the high-potential driving voltage EVDD is applied to the driving transistor DT connected to the third node N3 through the third transistor T3. The driving current Id supplied from the driving transistor DT to the light emitting element EL via the fourth switching transistor T4 is independent of the value of the threshold voltage Vth of the driving transistor DT, so that the threshold voltage Vth of the driving transistor DT may be compensated for.

The pixel circuit according to an embodiment of the disclosure may integrate scan signals applied to a plurality of switching transistors (e.g., the compensation transistor, the data supply transistor, and the initialization transistor). Emission control signals applied to the remaining plurality of switching transistors (e.g., light emission transistors) may also be integrated. Accordingly, the structure of the pixel may be simplified.

Further, it is possible to prevent or at least reduce flicker and enhance the image quality when driving at a low frequency by configuring the same path for resetting the anode electrode of the light emitting element in the holding period and the refresh period during low-frequency driving.

Further, as the transistors included in the pixel circuit are configured to include an oxide semiconductor layer, it may be rendered to be applied to various products, so that the manufacturing process may be converted into a platform.

Figure 5A:
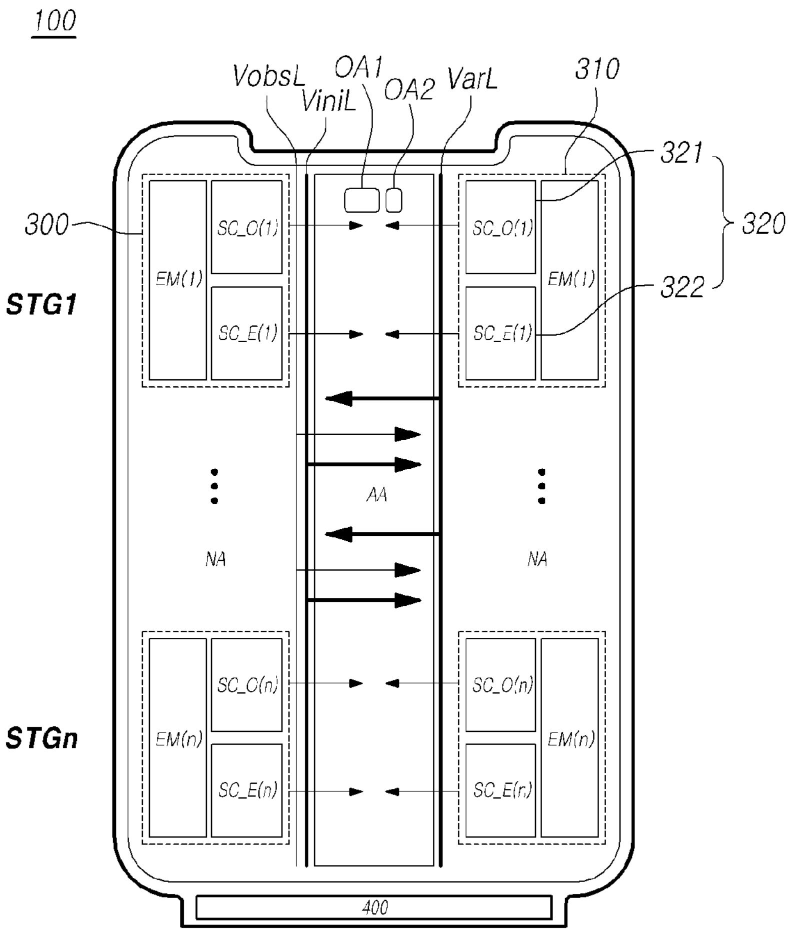
FIGS. 5A, 5B, and 5C are views illustrating a configuration of a gate driving unit in a display device according to an embodiment of the disclosure.
Figure 5B:
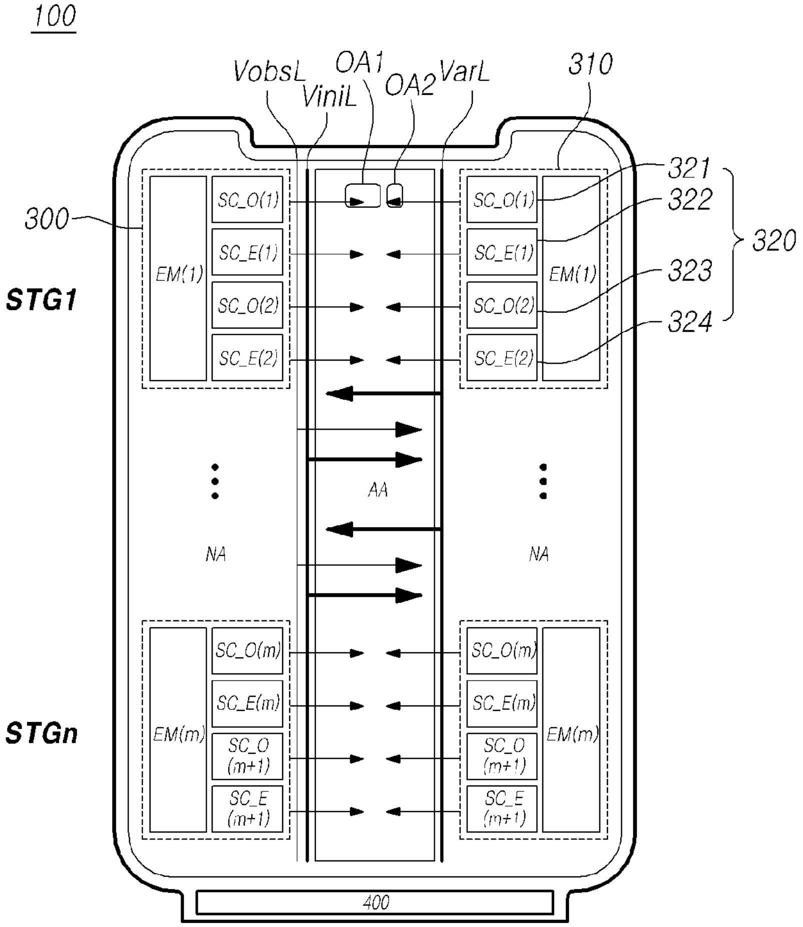
Figure 5C:
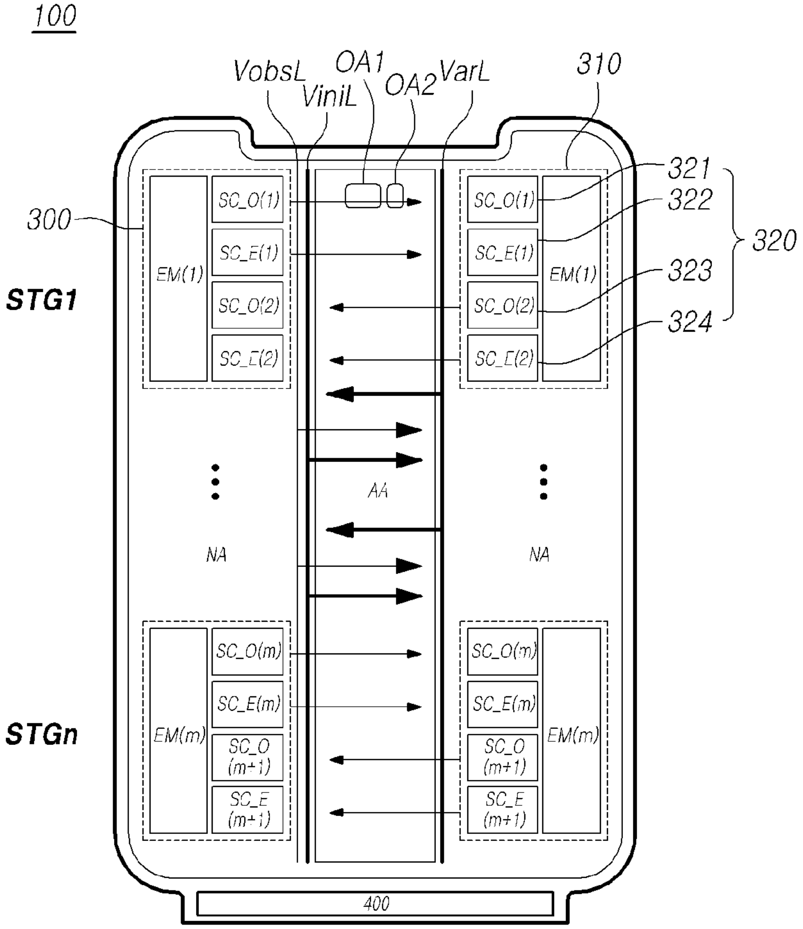

FIGS. 5A, 5B, and 5C are views illustrating a configuration of a gate driving unit in a display device according to an embodiment of the disclosure.

Referring to FIG. 5A, a gate driving unit 300 includes an emission control signal driving unit 310 and a scan driving unit 320. Each scan driving unit 320 may include an odd-numbered scan driving unit 321 and an even-numbered scan driving unit 322.

The gate driving units 300 constituted of a shift register of the scan driving unit 320 and the emission control signal driving unit 310 may be symmetrically configured on two opposite sides of the display area AA. The emission control signal driving unit 310 and the scan driving unit 320 on one side of the display area AA and the emission control signal driving unit 310 and scan driving unit 320 on the other side of the display area AA, which are symmetrically configured, each may output signals to the gate line GL. The gate line GL may include a scan line SCL and an emission control line EML.

Each of the stages STG1 to STGn of the shift register may include scan signal generating units SC_O(1) to SC_O(n) and SC_E(1) to SC_E(n) and emission control signal generating units EM(1) to EM(n) (e.g., circuits).

Further, the scan signal generating units SC_O(1) to SC_O(n) and SC_E(1) to SC_E(n) (e.g., circuits) may be formed close to the display area AA, and the emission control signal generating units EM(1) to EM(n) may be formed outside the scan signal generating units SC_O(1) to SC_O(n) and SC_E(1) to SC_E(n). However, without limitations thereto, the emission control signal driving unit 310 and the scan driving unit 320 may be differently disposed according to embodiments.

The scan signal generating units SC_O(1) to SC_O(n) and SC_E(1) to SC_E(n) output scan signals SC(1) to SC(n) through the scan lines SCL of the display panel 100. The emission control signal generating units EM(1) to EM(n) output emission control signals EM(1) to EM(n) through the emission control lines EML of the display panel 100.

The scan signals SC(1) to SC(n) supplied to the scan lines SCL of the n−3th pixel row may be used as signals for driving an Ath transistor (e.g., compensation transistor, etc.) included in the pixel circuit. Furthermore, the scan signals SC(1) to SC(n) supplied to the scan line SCL of the nth pixel row may be used to drive a Bth transistor (e.g., data supply transistor, etc.) included in the pixel circuit. At the same time, the scan signals SC(1) to SC(n) supplied to the scan line SCL of the nth pixel row may be used as signals for driving a Cth transistor (e.g., initialization transistor, etc.) included in the pixel circuit. The emission control signals EM(1) to EM(n) may be used as signals for driving a Dth transistor (e.g., emission control transistor, etc.) included in the pixel circuit. For example, if the emission control transistors of the pixels are controlled using the emission control signals EM(1) to EM(n), the emission time of the light emitting element is varied.

Referring to FIG. 5B, a gate driving unit 300 includes an emission control signal driving unit 310 and a scan driving unit 320. Each scan driving unit 320 may include a first odd-numbered scan driving unit 321, a first even-numbered scan driving unit 322, a second odd-numbered scan driving unit 323, and a second even-numbered scan driving unit 324.

The gate driving units 300 constituted of a shift register of the scan driving unit 320 and the emission control signal driving unit 310 may be symmetrically configured on two opposite sides of the display area AA. The emission control signal driving unit 310 and the scan driving unit 320 on one side of the display area AA and the emission control signal driving unit 310 and scan driving unit 320 on the other side of the display area AA, which are symmetrically configured, each may output signals to the gate line GL. The gate line GL may include a scan line SCL and an emission control line EML.

Each of the stages STG1 to STGm of the shift register may include scan signal generating units SC_O(1) to SC_O(m+1), SC_E(1) to SC_E(m+1) and emission control signal generating units EM(1) to EM(m).

Further, the scan signal generating units SC_O(1) to SC_O(m+1) and SC_E(1) to SC_E(m+1) may be formed close to the display area AA. The emission control signal generating units EM(1) to EM(m)) may be formed outside the scan signal generating units SC_O(1) to SC_O(m+1) and SC_E(1) to SC_E(m+1). However, without limitations thereto, the emission control signal driving unit 310 and the scan driving unit 320 may be differently disposed according to embodiments.

Referring to FIG. 5C, a description of the same configuration as that of FIG. 5B will be omitted.

The emission control signal driving unit 310 and the scan driving unit 320 on one side of the display area AA and the emission control signal driving unit 310 and scan driving unit 320 on the other side of the display area AA, which are symmetrically configured, may alternately output signals to different gate lines GL. The gate line GL may include a scan line SCL and an emission control line EML.

For example, the first odd-numbered scan driving unit 321 and the first even-numbered scan driving unit 322 may supply scan signals SC(1) to SC(m) from one side to the other side of the display area AA, and the second odd-numbered scan driving unit 323 and the second even-numbered scan driving unit 324 may supply scan signals SC(2) to SC(m+1) from the other side to the one side of the display area AA.

Referring to FIGS. 5A to 5C, a first initialization voltage bus line ViniL may be disposed between the gate driving unit 300 and the display area AA. Further, a bias voltage bus line VobsL or a second initialization voltage bus line VarL may be further disposed according to design needs.

The first initialization voltage bus line ViniL, the second initialization voltage bus line VarL, and the bias voltage bus line VobsL, respectively, may supply the first initialization voltage Vini, the second initialization voltage Var, and the bias voltage VobsL from the power supply unit 500 to the pixel circuit.

In the drawings, the first initialization voltage bus line ViniL, the second initialization voltage bus line VarL, and the bias voltage bus line VobsL are shown as being positioned on only one side of the left or right side of the display area AA but, without limitations thereto, may be positioned on two opposite sides or, even when positioned on one side, the position is not limited to the left or right side.

Referring to FIGS. 5A to 5C, one or more optical areas OA1 and OA2 may be disposed in the display area AA.

One or more optical areas OA1 and OA2 may be disposed to overlap one or more optical electronic devices, such as capture devices, such as cameras (image sensors) or detection sensors, such as proximity sensors and illuminance sensors, and the like.

The one or more optical areas OA1 and OA2 may have a transmittance higher than a certain level by forming a light transmission structure for the operation of the optical electronic device. In other words, the number of pixels P per unit area in the one or more optical areas OA1 and OA2 may be smaller than the number of pixels P per unit area in the normal area except for the optical areas OA1 and OA2 in the display area AA. In other words, the resolution of one or more optical areas OA1 and OA2 may be lower than that of the normal area in the display area AA.

The light transmission structure in one or more optical areas OA1 and OA2 may be formed by patterning a cathode electrode in a portion where the pixel P is not disposed. In this case, the patterned cathode electrode may be removed by a laser. Alternatively, a cathode electrode may be selectively formed and patterned using a material, such as an anti-cathode deposition layer.

Further, the light transmission structure in one or more optical areas OA1 and OA2 may be formed by separating the light emitting element EL and the pixel circuit in the pixel P. In other words, the light emitting element EL of the pixel P may be positioned on the optical areas OA1 and OA2, and the plurality of transistors TFT constituting the pixel circuit may be disposed around the optical areas OA1 and OA2, so that the light emitting element EL may be electrically connected to the pixel circuit through the transparent metal layer.

Further, the data driving unit 400 may be disposed below the display area AA.

Figure 6A:
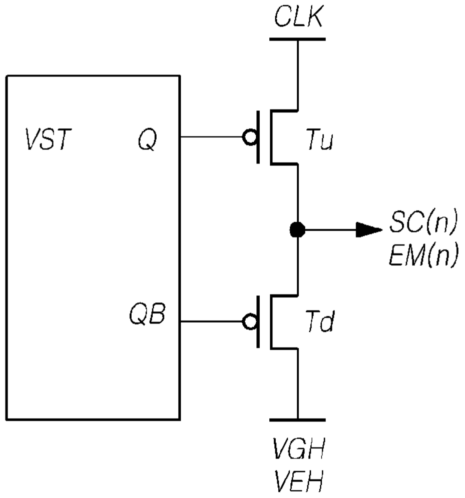
FIGS. 6A and 6B are views schematically illustrating a circuit of a gate driving unit according to an embodiment of the disclosure.
Figure 6B:
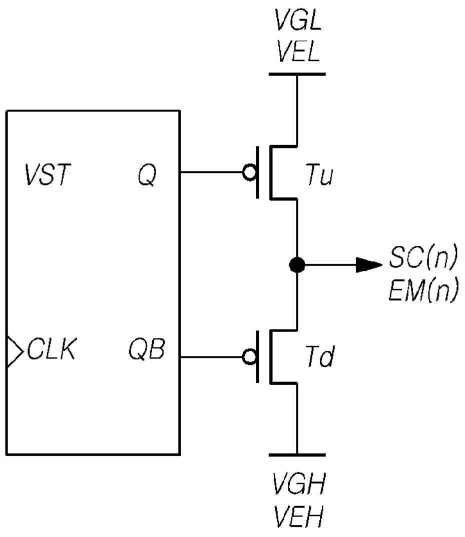

FIGS. 6A and 6B are views schematically illustrating a circuit of a gate driving unit.

Each stage of the emission control signal driving unit 310 and the scan driving unit 320 included in the gate driving unit 300 may be configured to include a plurality of transistors and a plurality of capacitors to be implemented as a pass-gate circuit as shown in FIG. 6A or an edge trigger circuit as shown in FIG. 6B.

In the pass-gate circuit, the clock CLK is input to the pull-up transistor Tu, which is turned on/off according to the voltage of the Q node. In contrast, in the edge trigger circuit, the low-potential voltages VGL and VEL, which are gate-on voltages, are supplied to the pull-up transistor Tu, which is turned on/off according to the voltage of the Q node, and the start signal VST and clock CLK are input. The pull-down transistor Td is turned on/off according to the voltage of the QB node, and high-potential voltages VGH and VEH are supplied and may be output as output signals, such as the scan signal SC(n) or emission control signal EM(n).

In the pass-gate circuit, the Q node is floated in a pre-charged state according to the start signal. When the clock CLK is applied to the pull-up transistor Tu while the Q node is floating, the Q node voltage is increased by bootstrapping, so that the voltage of the output signal, such as the scan signal SC(n) or emission control signal EM(n), is switched into the gate-on voltage.

Since the edge trigger circuit is synchronized with the edge of the clock CLK, and the voltage of the output signal is changed into the voltage of the start signal, the output signal is generated in the same waveform as the phase of the start signal. When the start signal waveform is changed, the output signal waveform is also changed accordingly. In the edge triggered circuit, the input signal overlaps the output signal.

It is difficult for the pass-gate circuit to generate an output signal which is out-of-phase of the input signal. If the transistors of the pass-gate circuit are implemented as p-type TFTs (PMOS), a gate-on voltage waveform for the p-type transistor may be output. When the pass-gate circuit is implemented with p-type transistors (PMOS), an inverter circuit for inverting the voltage of the output node is further required to output the gate-on voltage waveform of the n-type TFT.

The edge trigger circuit may generate an out-of-phase output signal. For example, the edge trigger circuit may obtain the gate-on voltage waveform of the n-type TFT without an inverter circuit by implementing the transistors as p-type TFTs.

The circuit of the gate driving unit 300 may include an input unit (e.g., a circuit) to which a start signal VST, a clock CLK, high-potential voltages VGH and VEH, and low-potential voltages VGL and VEL are applied, an operation unit (e.g., a circuit) configured to include a Q node and a QB node which is out-of-phase of the Q node, and an output unit for outputting an output signal, such as the scan signal SC(n) or emission control signal EM(n) through the pull-up transistor or pull-down transistor.

The plurality of transistors included in the circuit of the gate driving unit 300 may be configured to include a polycrystalline semiconductor layer and may also be configured to include an oxide semiconductor layer. Further, the plurality of capacitors included in the circuit of the gate driving unit 300 may include a stabilization capacitor in the input unit to which high-potential voltages VGH and VEH or low-potential voltages VGL and VEL are applied and include a boost capacitor, which is connected to the pull-up transistor Tu or pull-down transistor Td, in the output unit. The capacity of the boost capacitor may be larger than that of the stabilization capacitor.

The pixel circuit according to an embodiment of the disclosure may integrate scan signals applied to a plurality of switching transistors (e.g., the compensation transistor, the data supply transistor, and the initialization transistor). Emission control signals applied to the remaining plurality of switching transistors (e.g., light emission transistors) may also be integrated. Therefore, since the gate driving unit 300 is configured to only have one scan driving unit 320 and one emission control signal driving unit 310, the structure of the gate driving unit 300 may be simplified, implementing a narrow bezel.

Further, as the circuit constituting the gate driving unit 300 is simplified, power consumption may also be reduced.

A display device according to an embodiment of the disclosure may be described as follows.

A display device according to an embodiment of the disclosure comprises a display panel including a display area and a non-display area formed outside the display area and having a plurality of pixels and a gate driving unit including a scan driving unit for supplying a scan signal to the display panel and an emission control driving unit for supplying an emission control signal. The plurality of pixels include a light emitting element for emitting light in a brightness corresponding to a current amount of a driving current applied, a driving transistor controlling the current amount applied to the light emitting element, a storage capacitor connected to the driving transistor, and a first transistor (e.g., T1 of FIG. 3) and a second transistor (e.g., T5 of FIG. 3) including an oxide semiconductor layer and configured to be simultaneously turned on according to the scan signal.

In the display device according to an embodiment of the disclosure, a first electrode of the driving transistor may be connected to a third node connected with a third transistor (e.g., T2 of FIG. 3), a second electrode of the driving transistor may be connected to a first node connected with the first transistor, and a gate electrode of the driving transistor may be connected to a second node. The storage capacitor may be connected between the second node and a fourth node connected to an anode electrode of the light emitting element. The first transistor may be connected between the first node and a data line applying a data voltage. The second transistor may be connected between the fourth node and an initialization voltage line applying an initialization voltage. A gate electrode of the first transistor and a gate electrode of the second transistor may be connected to the scan line applying the scan signal.

The plurality of pixels of the display panel of the display device according to an embodiment of the disclosure may further comprise a fourth transistor (e.g., T3 of FIG. 3) connected between the third node and a first riving voltage (high-potential driving voltage) and having a gate electrode connected to an nth emission control line for applying an nth emission control signal and a fifth transistor (e.g., T4 of FIG. 3) connected between the first node and the light emitting element and having a gate electrode connected to an n−1th emission control line for applying an n−1th emission control signal. A cathode electrode of the light emitting element is connected to a second driving voltage (low-potential driving voltage) lower than the first driving voltage.

In the display device according to an embodiment of the disclosure, the plurality of pixels may be operated to include a first period, a second period, and a third period. During the first period, the driving transistor may be diode-connected through the third transistor.

In the display device according to an embodiment of the disclosure, during the second period, a data voltage may be applied to a gate electrode of the driving transistor.

In the display device according to an embodiment of the disclosure, the third transistor and the first transistor or the second transistor may be simultaneously turned on during one horizontal period.

In the display device according to an embodiment of the disclosure, the scan signal may be operated at a turn-on level during four horizontal periods.

In the display device according to an embodiment of the disclosure, a sampling operation may be performed when the scan signal of an nth pixel row and the scan signal of an n−3th pixel row are simultaneously at the turn-on level.

In the display device according to an embodiment of the disclosure, the gate driving unit may be formed in a symmetrical structure.

In the display device according to an embodiment of the disclosure, the gate driving unit disposed on two opposite sides of the display area may apply a signal to the same pixel circuit.

In the display device according to an embodiment of the disclosure, the gate driving unit on one side of the display area and a gate driving unit on the other side of the display area may alternately apply a signal to different pixel circuits.

In the display device according to an embodiment of the disclosure, the emission control signal driving unit may be disposed outside the scan driving unit.

In the display device according to an embodiment of the disclosure, the gate driving unit may include one emission control signal generating unit and a plurality of scan signal generating units in one stage.

In the display device according to an embodiment of the disclosure, the gate driving unit may be configured as a circuit including a plurality of transistors. The plurality of transistors may include a polycrystalline semiconductor layer or an oxide semiconductor layer.

In the display device according to an embodiment of the disclosure, the gate driving unit may include an input unit receiving a gate-on-potential voltage or a gate-off-potential voltage, an operation unit having a Q node and a QB node which is out-of-phase of the Q node, and an output unit having a pull-up transistor and a pull-down transistor.

In the display device according to an embodiment of the disclosure, the input unit may further include a stabilization capacitor, and the output unit may further include a boost capacitor.

In the display device according to an embodiment of the disclosure, the boost capacitor may have a larger capacity than the stabilization capacitor.

In the display device according to an embodiment of the disclosure, the display panel may include one or more optical areas having a light transmittance structure and a normal area except for the one or more optical areas.

In the display device according to an embodiment of the disclosure, the one or more optical areas may at least partially overlap an optical electronic device.

In the display device according to an embodiment of the disclosure, the one or more optical areas may have a lower resolution than the normal area.

The above-described embodiments are merely examples, and it will be appreciated by one of ordinary skill in the art various changes may be made thereto without departing from the scope of the disclosure. Accordingly, the embodiments set forth herein are provided for illustrative purposes, but not to limit the scope of the disclosure, and should be appreciated that the scope of the disclosure is not limited by the embodiments. The scope of the disclosure should be construed by the following claims, and all technical spirits within equivalents thereof should be interpreted to belong to the scope of the disclosure.

What is claimed is:

1. A display device, comprising:

a display panel including a display area and a non-display area outside the display area, the display panel having a plurality of pixels; and a gate driving circuit including a scan driving circuit configured to supply a scan signal to the display panel and an emission control driving circuit configured to supply an emission control signal to the display panel;

wherein the plurality of pixels include:

a light emitting element configured to emit light having a brightness corresponding to a current amount of a driving current applied to the light emitting element;

a driving transistor configured to control the current amount applied to the light emitting element;

a storage capacitor connected to the driving transistor; and a first transistor and a second transistor including an oxide semiconductor layer, the first transistor and the second transistor configured to be simultaneously turned on according to the scan signal.

2. The display device of claim 1, wherein a first electrode of the driving transistor is connected to a third node connected with a third transistor, a second electrode of the driving transistor is connected to a first node connected with the first transistor, and a gate electrode of the driving transistor is connected to a second node, wherein the storage capacitor is connected between the second node and a fourth node connected to an anode electrode of the light emitting element, wherein the first transistor is connected between the first node and a data line configured to apply a data voltage, wherein the second transistor is connected between the fourth node and an initialization voltage line configured to apply an initialization voltage, and wherein a gate electrode of the first transistor and a gate electrode of the second transistor are connected to the scan line that is configured to apply the scan signal.

3. The display device of claim 2, wherein the plurality of pixels further comprises:

a fourth transistor connected between the third node and a first driving voltage, the fourth transistor having a gate electrode connected to an nth emission control line that applies an nth emission control signal; and a fifth transistor connected between the first node and the light emitting element, the fifth transistor having a gate electrode connected to an n−1th emission control line that is configured to apply an n−1th emission control signal;

wherein a cathode electrode of the light emitting element is connected to a second driving voltage that is less than the first driving voltage.

4. The display device of claim 3, wherein the plurality of pixels are operated to include a first period, a second period, and a third period, and wherein during the first period, the driving transistor is diode-connected through the third transistor.

5. The display device of claim 4, wherein during the second period, the data voltage is applied to a gate electrode of the driving transistor.

6. The display device of claim 3, wherein the third transistor and the first transistor or the second transistor are simultaneously turned on during one horizontal period.

7. The display device of claim 1, wherein the scan signal is operated at a turn-on level during four horizontal periods.

8. The display device of claim 1, wherein a sampling operation is performed responsive to the scan signal of an nth pixel row and the scan signal of an n−3th pixel row are simultaneously at a turn-on level.

9. The display device of claim 1, wherein the gate driving circuit comprises a symmetrical structure.

10. The display device of claim 1, wherein the gate driving circuit disposed on two opposite sides of the display area applies a signal to a same pixel circuit.

11. The display device of claim 1, wherein the gate driving circuit on one side of the display area and another gate driving circuit on another side of the display area alternately apply a signal to different pixel circuits.

12. The display device of claim 1, wherein the emission control driving circuit is outside the scan driving circuit.

13. The display device of claim 1, wherein the gate driving circuit includes one emission control signal generating circuit and a plurality of scan signal generating circuits in one stage.

14. The display device of claim 1, wherein the gate driving circuit is configured as a circuit including a plurality of transistors, and wherein the plurality of transistors include a polycrystalline semiconductor layer or an oxide semiconductor layer.

15. The display device of claim 14, wherein the gate driving circuit includes:

an input circuit receiving a gate-off-potential voltage or a gate-on-potential voltage;

an operation circuit having a Q node and a QB node which is out-of-phase of the Q node; and an output circuit having a pull-up transistor and a pull-down transistor.

16. The display device of claim 15, wherein the input circuit further includes a stabilization capacitor, and wherein the output circuit further includes a boost capacitor.

17. The display device of claim 16, wherein the boost capacitor has a larger capacity than the stabilization capacitor.

18. The display device of claim 1, wherein the display panel includes one or more optical areas having a light transmittance structure and a normal area except for the one or more optical areas.

19. The display device of claim 18, wherein the one or more optical areas at least partially overlap an optical electronic device.

20. The display device of claim 18, wherein the one or more optical areas have a lower resolution than the normal area.

21. A display device, comprising:

a display panel including a plurality of pixels; and a gate driving circuit including a scan driving circuit configured to supply a scan signal to the display panel and an emission control driving circuit configured to supply an emission control signal to the display panel;

wherein the plurality of pixels include a first transistor and a second transistor configured to be simultaneously turned on according to the scan signal.

* * * * *